UNITED STATES PATENT OFFICE.

ERNST EBERHARD HIPPE, OF COPENHAGEN, DENMARK.

MAKING ARTIFICIAL MARBLE.

No. 873,371.  Specification of Letters Patent.  Patented Dec. 10, 1907.

Application filed October 4, 1905. Serial No. 281,362.

*To all whom it may concern:*

Be it known that I, ERNST EBERHARD HIPPE, sculptor, a citizen of Denmark, residing at Dronning Ilgas Vej. No. 7, Copenhagen, Denmark, have invented a new and useful Improvement in Making Artificial Marble, of which the following is a specification.

The present invention relates to a method of making artificial marble or stone of gypsum by which is attained a product, the appearance of which has a striking likeness to the natural marble or stone, and by which the inconveniences are avoided which are connected with the hitherto known methods for the same purpose. When making artificial marble or stone of gypsum according to this method, the gypsum can either be used in uncolored state, or colors can in suitable manner be applied in the mass of gypsum for producing the designs or figures, which are characteristic for the different sorts of marble or stone. The color-design can be applied to the gypsum in such way that only the surface is colored or so that the whole mass is penetrated with the colors.

According to the present method plates or other objects, such as architectural plastic objects of every kind, as figures, vases and the like, can be made of artificial marble or stone of gypsum. When making such plates, there is first produced a suitable plate of gypsum, colored or without colors, such as is desired. The produced gypsum-plate is slowly dried in a drying-apparatus at 60-95° (C) and is then slowly dipped into a hardening-bath. This is composed of resin and petroleum, and kept melted at 90-95° C. Resin melts only at 120-140° C. By adding petroleum the melting point of the mixture is lowered so much that it is still fluid at 95° C. The dipping into the resin-bath lasts for about 20 minutes or a less time, according as the plate shall be impregnated to a greater or less degree. By way of promoting the penetration of the hardening-fluid the gypsum-plate can also be placed in a vacuum-reservoir and the air can be sucked out of this, whereupon the fluid is introduced and pressure effected by pumping the air out. The plate thus impregnated is then heated to about 80-95° C. for about four hours, whereby the impregnating-fluid, if the plate is not entirely penetrated, is furthermore spread and penetrates deeper into the material, and, besides, the petroleum evaporates.

Heating and drying is best effected in a drying-canal which can be arranged in such way, that several gypsum-flags can be placed upon a stand side by side. This stand is placed on a tray provided with rolls and can be driven through the canal. The running off resin is accumulated in a basin and can be used again later on. The stand, on which the flags are placed, is at the upper part provided with a hook, which can be seized by a crane, and by which the whole stand with the plates can be let down into the bath and moved back into the drying-canal. In this way 20 flags can be dipped at the same time into the bath.

The bath is prepared by melting at first the resin and then adding the petroleum. It is therefore adequate to provide the resin-kettle with an oil-mantle, which facilitates the regulation of the temperature, which must not exceed 95° C. If this temperature in the bath or the drying-canal is exceeded, the material will get brittle.

If colors are used for coloring the gypsum, these will only after hardening with the resin appear distinctly. The gypsum-plate being cast on a smooth glass-plate the surface is smooth, and by merely rubbing with felt or the like a nice polish is therefore immediately attained, especially if the flags are made of doubly kilned stucco-gypsum or strongly kilned gypsum (Estrich-gypsum). In order to raise the effect of the polish a shellac-polish can also be used, or the surface can be ground with stone.

For the gypsum-flags there can be used the different sorts of gypsum to be had in the market. The ordinary, coarse, and cheapest gypsum for building purposes gives flags, which especially have the fine transparent surface of marble. According to the porosity of the different sorts of gypsum, these absorb more or less resin. The coarse gypsum absorbs most and gets the nicest appearance, whereas the finer description of gypsum absorbs less. On the other hand the plates made of fine gypsum - doubly or strongly kilned get stronger than those made of coarse gypsum, but here also the peculiar, transparent surface of the marble is attained, though not to the same degree. By submitting a plate, before the gypsum is entirely stiffened, to pressure by means of a press, the same can be made still stronger.

When using doubly kilned gypsum it is necessary to allow the wall-saltpeter to separate itself on the surface of the plate after casting. The separated salts are then rinsed in lukewarm water, and the plates are dried and impregnated in the usual way. When using other species of gypsum salts never break out after the impregnation. By other formerly-known methods it happens, however, often that salts crystallize on the surface, which is a great inconvenience.

In many instances it can be suitable to add to the resin some oily or fatty substance such as wax, paraffin, spermaceti, or stearin. By using one or several of these substances there can be attained other important technical qualitites, to wit the plates can stand alcohol and can better resist pushes and strokes, and these substances are specially adapted for the imitation of bright marbles, as resin renders the marble too dark. On the other hand petroleum effects with resin only in very porous gypsum the highest hardening. Also imitations or inlaying of other species of marble or stone in a plate can be made in this way. The inlays are first cast separately in thin tin-molds consisting of vertically standing tin strips. The gypsum in the molds can also be submitted to pressure, by which the mass gets specially strong, a part of the water being at the same time pressed out and bubbles being driven out.

A short time before the material is entirely stiffened the molds are carefully removed, and the remainder of the colored gypsum, which shall form the plate, in which the inlaying is placed, is poured on. Instead of using a plane glass-plate as support, bowed glass-plates, glazed clay or other material with a smooth, not porous surface can be used.

By the use of adequate molds there can according to the above described method be made architectural plastic objects of every kind, as figures and vases, and the like. When making many plates it will often be suitable to harden the used gypsum for longer time; for this purpose glue-water is adequate.

By the method described above an artificial marble or stone can consequently be made, the surface of which has a striking likeness with the natural marble or stone, as well with regard to the design of colors as to the transparency. On account of the mode of hardening the flags made according to this method have only an insignificant absorbent capacity. Therefore they stand humidity much better than other similar flags. Pouring water daily for a long time on the flags does not at all influence these flags. They have besides the favorable technical quality, that they are bad conductors of electricity so that they are adapted for buildings of iron & steel constructions.

The above specified method of hardening by dipping into a resin-bath can also be used for plates or other articles of magnesite or similar substances.

I claim:—

1. The herein described method of making artificial marble or stone which consists in dipping an article of gypsum into a hardening bath comprising resin and petroleum kept in a melted condition and allowing the liquid to penetrate the article, and then heating the article as described for the purpose specified.

2. The herein described method of making artificial marble or stone which consists in dipping an article of gypsum into a hardening bath comprising resin and petroleum to which has been added a fatty substance as described, the various substances being kept in a melted condition, allowing the liquid to penetrate the article and then heating the article as and for the purpose set forth.

3. The herein described method of making artificial marble or stone which consists in first forming the article of gypsum, and subjecting it to pressure before the gypsum has entirely hardened, then dipping the article into a hardening bath comprising resin and petroleum kept in a melted condition, allowing the liquid to penetrate the article and then heating the article as described for the purpose specified.

In testimony whereof, I have signed my name to this specification in the presence of two subscribing witnesses.

ERNST EBERHARD HIPPE.

Witnesses:
C. HOHNELIN,
A. CHRISTENSEN.